W. H. McGEE AND R. S. BERRY.
AUTOMATIC CONTROL MECHANISM.
APPLICATION FILED FEB. 21, 1918.

1,406,405.

Patented Feb. 14, 1922.

WITNESSES:-

INVENTORS.

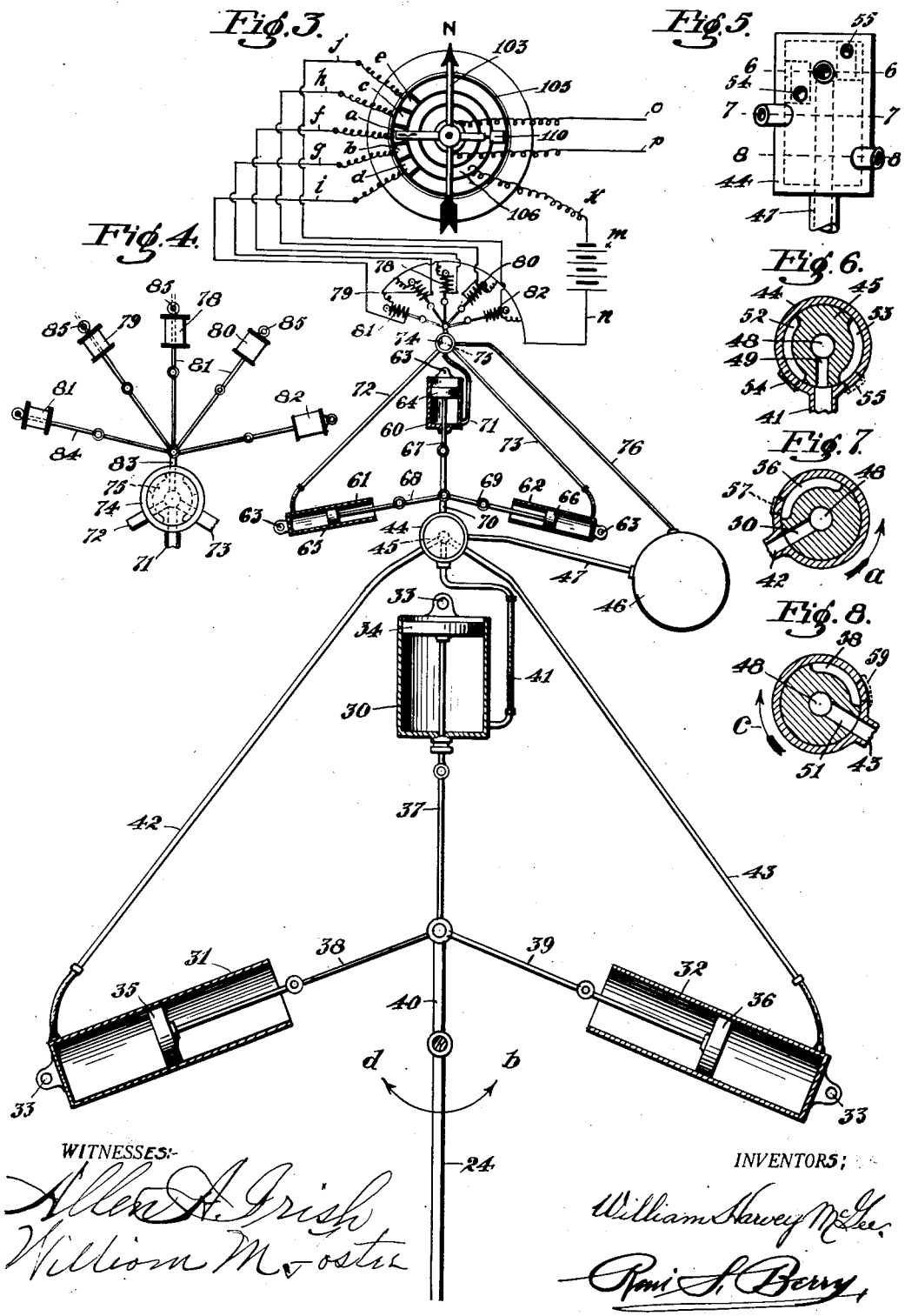

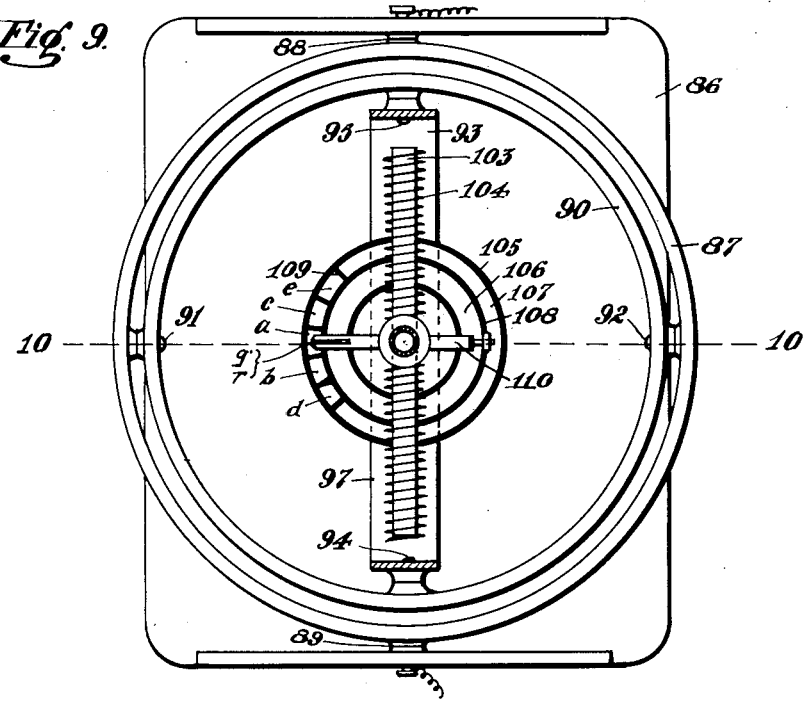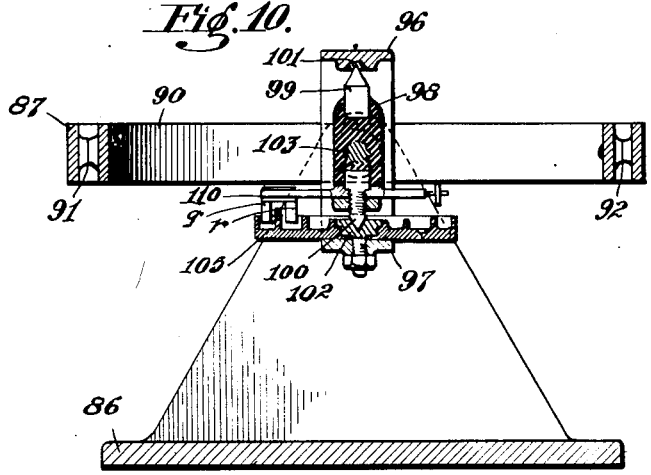

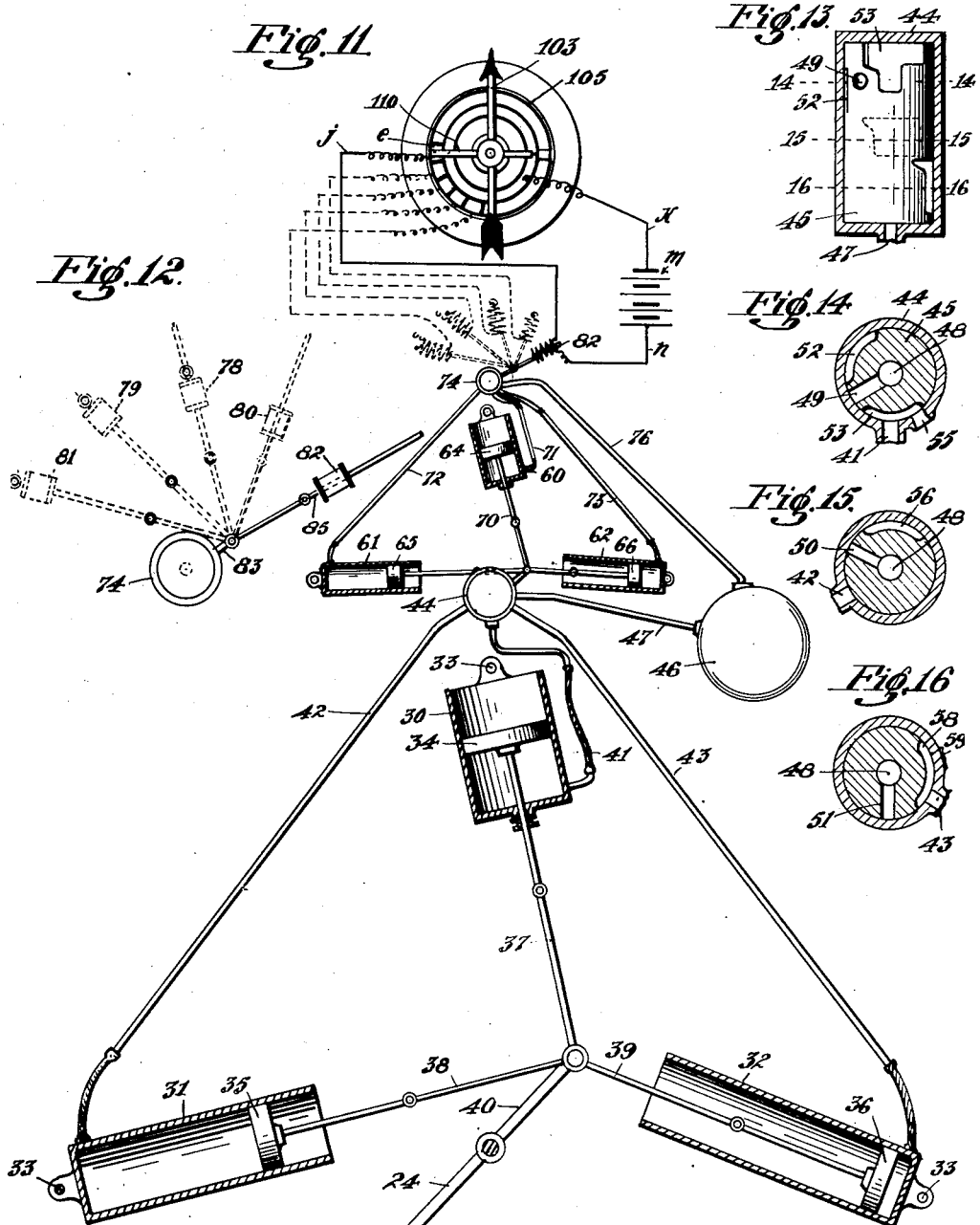

UNITED STATES PATENT OFFICE.

WILLIAM HARVEY McGEE AND RENI S. BERRY, OF LOS ANGELES, CALIFORNIA.

AUTOMATIC CONTROL MECHANISM.

1,406,405.   Specification of Letters Patent.   Patented Feb. 14, 1922.

Application filed February 21, 1918. Serial No. 218,549.

*To all whom it may concern:*

Be it known that we, WILLIAM HARVEY McGEE and RENI S. BERRY, citizens of the United States, residing at Los Angeles, in the county of Los Angeles and State of California, have invented a new and useful Automatic Control Mechanism, of which the following is a specification.

This invention relates to an automatic control mechanism for airplanes and the like and particularly pertains to a mechanism for directing and maintaining an airplane or the like in a predetermined set course.

It is the object of this invention to provide means whereby an airplane or other self-propelled vehicle may be set to travel towards a point, and which is especially adapted for use on self-controlled aerial and aquatic vessels.

Another object is to provide an airplane which may be propelled and directed toward a remote point without manual control.

Another object is to provide a compass controlled mechanism operable on deviation of a vessel, such as an airplane or the like, from its course to restore the vessel to its course and guide its travel in a definite direction.

A further object is to provide a compressed air apparatus for actuating steering rudders and the like and also to provide electro-mechanical means for controlling said air apparatus.

Other objects will appear hereinafter.

In the embodiment of the invention set forth hereinafter and illustrated by the accompanying drawings, a compass of any suitable description is employed as a means for automatically indicating a fixed direction, said compass being fitted with means for controlling the flow of electric current through a series of magnets arranged to operate a small relay air valve for directing air to an air operated means for actuating a larger air valve controlling air operated means for maintaining a steering rudder in a straight ahead position or swinging it to the right or left according to the position assumed by the vessel body relative to the compass needle.

For the purpose of illustrating the principle and operation of the invention, it is hereinafter set forth as applied to an airplane but it may be employed on any other self-propelled vehicle or vessel where it is desirable to provide an automatic steering mechanism.

The invention is illustrated in the accompanying drawings in which.

Figure 1:
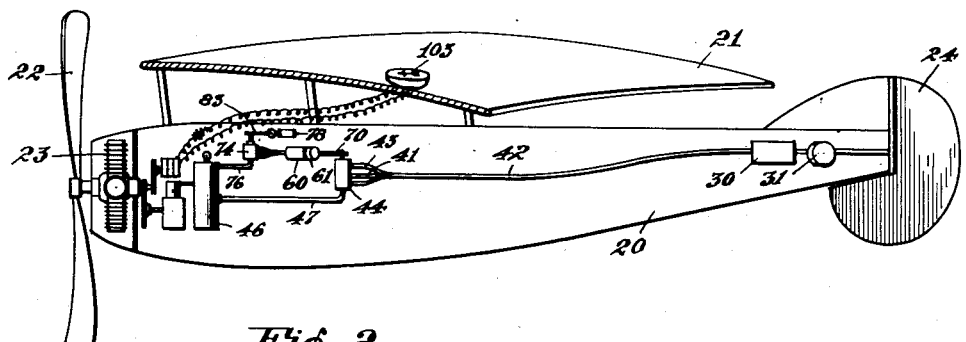
Figure 1 is a diagram illustrating the application of the invention to an airplane.
Figure 2:
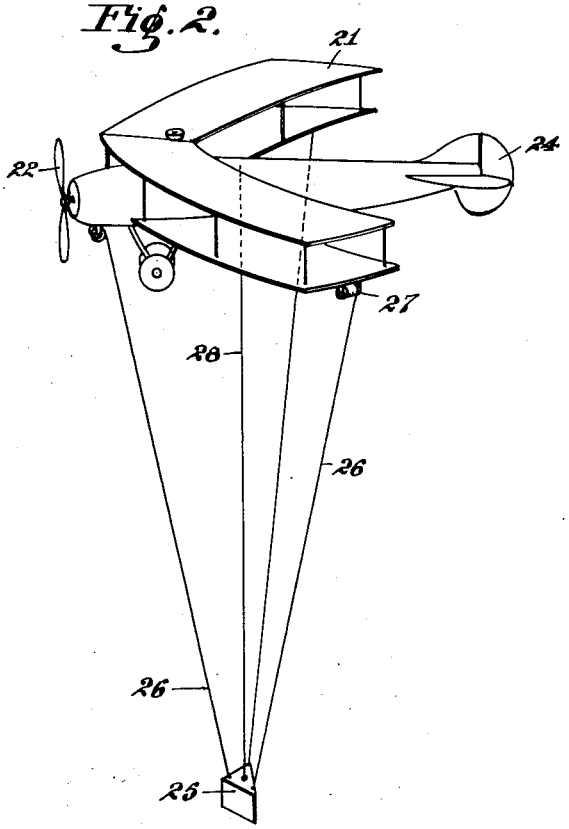
Figure 2 is a perspective view illustrating a self-controlled airplane adapted to be equipped with the control mechanism constituting the essence of this invention.

Figure 3 is a diagram of the automatic steering mechanism showing a preferred embodiment of the air apparatus for operating the steering rudder, the electro-mechanical means controlling the air apparatus, and an electro-compass for automatically governing the position of the steering rudder through said electro-mechanical and air apparatus, and illustrating the parts as disposed in the straight ahead position.

Figure 4 is a view in diagram showing the electro-mechanical device for actuating a relay air valve.

Figure 5 is a view in side elevation of the air controlling valves.

Figures 6, 7, and 8 are sections through the valve as seen on the lines 6—6, 7—7, and 8—8, respectively of Figure 5 showing the valves as disposed in the straight ahead position.

Figure 9 is a plan view illustrating an embodiment of the compass control.

Figure 10 is a view of same in vertical section and elevation as seen on the line 10—10 of Figure 9.

Figure 11 is a diagram of the control mechanism shown in Figure 3 illustrating the parts as positioned in swinging the steering rudder to the left in directing the vessel to the right to restore it to its course.

Figure 12 is a diagram illustrating the manner in which the relay air valve is operated electro-mechanically in effecting the positioning of the parts as shown in Figure 11.

Figure 13 is a view in section and elevation of the air valves when turned to the position shown in Figure 11.

Figures 14, 15, and 16 are sectional views of the valves as seen on the lines 14—14, 15—15, and 16—16, respectively of Figure 13.

More specifically 20 indicates an airplane body which is here shown as provided with rearwardly divergent supporting planes 21 and adapted to be driven by a propeller 22 operated by a motor 23 of any suitable construction. The airplane is shown as adapted to be steered horizontally by a vertical tail rudder 24 pivoted to swing from side to side. If desired the airplane may be equipped with a stabilizing device here illustrated as embodying a weight 25 suspended by cables 26 such distance beneath the airplane as to normally maintain the latter in a desired position relative to the horizontal during flight.

The cables 26 are attached to the airplane body and to the planes at such points that the weight will exert a pull on a cable attached to the machine at a point opposite a point of dip. Reels 27 may be provided to receive the cables 26 from which the cables may unwind on lowering of the weight by a control cable 28; the weight being preferably designed to be lowered automatically when the airplane is in flight by mechanism not necessary to be here shown, until the cables 26 are unwound to a point of fixed connection to the drums.

The means for operating the steering rudder embodies a series of cylinders 30, 31, and 32 mounted to swing on pivots 33, the pivots being arranged at the corners of a triangle. Pistons 34, 35, and 36 in the cylinders 30, 31, and 32 respectively, pivotally connect through stems 37, 38, and 39, with an arm 40 attached to the rudder 24. The cylinder 30 is arranged to be normally disposed in longitudinal alignment with the rudder 24 when the latter is in a straight ahead position and the cylinders 31, and 32 are arranged on opposite sides of the arm 40 and inclined toward each other and toward the cylinder 30 so that equal pressure behind the pistons 35 and 36 will co-operate with the pressure in front of the piston 34 to normally maintain the rudder 24 in a straight ahead position as shown in Figure 3. Fluid pressure is delivered to or exhausted from in front of the piston 34 and behind the pistons 35 and 36 through conduits 41, 42, and 43 connecting with the cylinders and opening thereto at the necessary points and leading from a valve casing 44 fitted with a cylinder valve 45 adapted to control the flow of fluid pressure to and from the cylinders and from a source of fluid pressure supply in a storage reservoir 46 through a supply pipe 47.

The air control valve is illustrated in detail in Figures 5, 6, 7, and 8, and comprises a rotary cylinder having an axial passage 48 in open communication through the valve casing with the fluid pressure supply pipe 47. A series of ducts 49, 50, and 51 lead from the passage 48 and communicate with the conduits 41, 42, and 43 through the valve casing when the valve cylinder is in its normal central position. It will thus be seen that when the valve is in its central position, fluid pressure will be delivered from the reservoir to each of the cylinders and will act to maintain the pistons in their advanced positions; the pressure in front of the piston 34 exerting a pull through the stem 37 on the arm 40 to dispose the rudder in a straight ahead position and the pressure behind the pistons 35 and 36 exerting an equal thrust on opposite sides of the arm 40 in an angular direction toward the pull of the piston 34 so as to co-operate with the latter in maintaining the rudder in the straight ahead position when the air controlled valve is in its central position. The valve 45 is formed with depressions 52 and 53 on its circumferential face on opposite sides of the duct 49 and extending above and below the latter so as to open the exhaust ports 54 and 55 formed in the valve casing, out of horizontal alignment with the duct 49. This arrangement is provided so that on turning the valve to the right or left, the duct 49 will not be opened to the exhaust port, but will remain closed by the valve casing wall, yet permit exhaust from the conduit 41 through either depression 52 or 53 and its respective exhaust port 54 or 55 according to the direction in which the valve is turned. From this it will be seen that exhaust will be effected from in front of the piston 34 on the valve being turned in either direction from its central position. A depression 56 is formed in the valve cylinder to one side of the duct 50 and is adapted to open communication between the conduit 42 and an exhaust port 57 when the valve is turned to the right; the exhaust port 57 being positioned out of horizontal alignment with the duct 50 so that the latter will not open to the exhaust port on the valve being turned to the left. Similarly a depression 58 is formed in the valve wall to the right of the duct 51 and is adapted to open the conduit 43 to an exhaust port 59 on the valve being turned to the left; the port 59 being arranged out of horizontal alignment with the duct 51 so as not to open the conduit 43 to the exhaust port when the valve is turned to the right. It will now be seen that on turning the valve to the right as indicated by the arrow $a$ in Figure 7, exhaust will be effected through the conduits 41 and 42 so that expansion of fluid pressure in the cylinder 32 will force the piston therein outwardly to swing the rudder 24 to the right as indicated by the arrow $b$, and that on turning the valve from its central position to the left as indicated by the arrow $c$ in Figure 8, exhaust of the cylinders 31 and 32 will be effected through the conduits 41 and 43 so that pressure in the cylinder 31 will retract the piston 35 and swing the rudder to the left as indicated by the arrow $d$. It will also be seen that upon restoring the valve to its central position, equal fluid pressure will be delivered to each of the cylinders to restore the rudder to its central position.

In carrying out the invention, operation of the valve 45 is designed to be effected electrically, but as the power required to operate the valve may be greater than that available by such electrical equipment as is suitable to be employed in a mechanism of this character, an auxiliary or relay fluid-pressure valve actuating means is provided. This means substantially corresponds to that employed for operating the steering rudder, only is of smaller proportions and embodies a series of cylinders 60, 61, and 62 mounted on pivots 63, and fitted with pistons 64, 65, and 66 connected through stems 67, 68, and 69 with the stem 70 attached to the valve 45 for turning the latter. Conduits 71, 72, and 73, lead from the cylinders to a valve casing 74 fitted with a valve 75 which valve and valve casing with the connecting conduits correspond in construction and arrangement with the valve 45 and casing 44 and therefore requires no further description as to its construction. The operation of the valve 75 also corresponds with that of valve 45 in that fluid pressure from the reservoir 46 passing through a feed pipe 76 will be delivered to the cylinders 60, 61, and 62 when the valve 75 is in its central position to maintain the valve 45 in its central position, and on turning the relay valve to right or left, the pistons 65 and 66 will be shifted to turn the main valve 45 to the right or left. The power required to operate the valve 45 being comparatively small, the cylinders 60, 61, and 62 may be of small dimensions and the valve 75 may be made of such small size that but little power will be required for its operation.

The electrical means for operating the relay valve 75 is here shown as embodying a series of electro-magnets comprising a central magnet 78 flanked by intermediate magnets 79 and 80 interposed between central magnet 78 and outer left and right magnets 81 and 82. These magnets are arranged on an arc of a circle, preferably less than a semi-circle concentric with the outer end of an arm 83 connected to the valve 75 when the arm is disposed in a central position, the electro-magnets being provided with cores 84 pivotally attached to the arm 83 and the electro-magnets being pivoted at 85 to permit them to swing and be disposed substantially in alignment with their cores when the latter are caused to change their positions by the change in position of the valve arm 83 when energized serves to restore the relay valve to, and to maintain it in, its normal central position, the intermediate electro-magnets 79 and 80 operating when energized when the central magnet is deenergized to swing the relay valve to the left or right a partial revolution to slowly exhaust air from the cylinder 61 or 62 and effect a slow movement of the pistons 65 and 66 with a corresponding slow movement of the valve 45 and the rudder controlled thereby. The outer left and right electro-magnets 81 and 82, when energized, operate when the magnets 78, 79, and 80 are deenergized to swing the valve 75 to its extreme left or right position to quickly admit air to the cylinders 61 and 62 and effect a corresponding rapid movement of the valve 45 and the rudder controlled thereby. To effect variation in the speed of the exhaust controlled by the valves 75 and 45, the depressions 52 and 53 in the valves are tapered relative to the ports 54 and 55 so that the initial opening of the depressions to the ports, a narrow or restricted communication will be effected and on continued opening movement of the depressions to the ports, a gradual increasing area of communication will take place until a maximum opening of the ports occur.

Energizing of the electro-magnets is automatically controlled according to the direction of travel of the vehicle and its deviation from a set course which is effected through the medium of a direction indicating device having the nature of a compass and embodying a member adapted to remain in a definite direction irrespective of the position assumed by the vessel. For convenience in illustration, this compass is here shown as comprising an electro-magnetic compass but it may obviously be of any suitable type of construction, for example, a gyroscopic compass may be employed. The compass is here shown as embodying a base 86 formed with standards on which a balanced horizontal ring 87 is pivoted at its diametrically opposite sides on pivot pins 88 and 89. A second horizontal ring 90 is pivoted in the ring 87 at right angles to the pivotal mounting of the latter on pivot pins 91 and 92. A vertically disposed needle carrying frame 93 is pivotally carried within the inner ring 90 on pivot pins 94 and 95. The frame 93 is formed with spaced upper and lower parallel members 96 and 97 between which a block 98 of non-conducting material is pivoted and arranged vertically centrally of the rings 87 and 90. The pivotal mounting of the block 98 comprises metallic conducting members 99 and 100 tapered at their ends and seating in bearings 101 and 102. The horizontal core 103 is carried centrally of the block 98 and extends in alignment with the pivot pins 88, 89, 94 and 95 when the parts are in their normal horizontal position. The core is surrounded by a coil 104, the terminals of which connect with a source of electrical supply, and the coils are so formed that when an electrical current is directed therethrough, the core will normally assume a position extending north and south. The various pivotal mountings between the compass base 86 and the compass core and coil comprising the compass needle, insure the needle and the frame 93 remaining in a horizontal position irrespective of inclination of the vehicle to which the base 86 is attached.

Supported on the lower frame member 97 and insulated therefrom is a pan 105, preferably formed of insulated material, having a pair of concentric circular channels 106 and 107 separated by an insulated partition 108. The outer channel is provided with a series of radial partitions 109 forming pots $a$, $b$, $c$, $d$, and $e$, which with the channel 106 contain mercury or other liquid conducting material to form electrical contact members. The members $a$, $b$, $c$, $d$, and $e$ connect with electrical conductors $f$, $g$, $h$, $i$, and $j$ leading to one of the terminals of the magnets 78, 79, 80, 81, and 82 respectively. A conductor $k$ leads from the contact member 106 to one terminal of a battery $m$, the other terminal of which connects with a conductor $n$ leading to the other terminals of the electro-magnets. The conductors $f$, $g$, $h$, $i$, $j$, and $k$ lead through the pivots 94, 91, and 89 in any suitable fashion and are insulated therefrom so as not to interfere with electrical current delivered to the coil 104 through conductors $o$ and $p$ which also lead through the pivots. Mounted on the block 98 constituting the compass arbor is an arm 110 carrying a pair of flexible contact members $q$ and $r$ electrically connected together and insulated from the arm. These contact members $q$ and $r$ extend in the channels 107 and 106 respectively so as to form an electrical connection between the inner circular contact member 106 and either of the contact members $a$, $b$, $c$, $d$, and $e$, according to the position of the compass needle relative to the frame 93. The arm 110 is designed to be normally positioned to dispose the contact member $q$ in electrical connection with the contact member $a$ so as to normally maintain a closed circuit through the electro-magnet 78 thus energizing the latter so that it will exert a pull on its core and operate to normally maintain the valve 75 in its normal central position as indicated in Figure 4.

The cup 105 is adjustably mounted so that it may be turned to and secured in any desired position on the frame 93 and the arm 110 is adjustably mounted on the compass arbor so that it may be turned and disposed at any desired position relative to the compass needle. This adjustment of the pan and arm is provided as a means for setting the course of travel of the vehicle relative to the north and south position of the compass needle, the position of the arm 110 and the central contact member $a$ being fixed relative to the straight ahead position of the vehicle and its rudder relative to the compass. For example, assume the parts to be positioned as shown in Figure 3 with the compass needle pointing north and south and the longitudinal center of the airplane and its rudder positioned in alignment with the compass needle and the arm 110 disposed at right angles to the compass needle with the circuit closed through contact member $a$. When the parts are thus positioned, the rudder is set to direct the vehicle due north. When it is desired to set the course of the vehicle in another direction, the vehicle is positioned before starting so that its longitudinal center will extend in the desired direction. The compass needle will maintain its north and south position, thus disposing the arm 110 with the contact member $q$ thereon out of register with the central member $a$. It will then be necessary to turn the pan 105 on the frame 93 to bring the contact member $a$ in electrical connection with the wiper $q$, or the arm 110 may be adjusted on the arbor to dispose the contact member $a$ and wiper $q$ in register.

In the operation of the invention, assume the airplane to be set in flight and as traveling straight ahead in any direction in which it is set to travel by the adjustment just described. In event that the course of the vessel be changed by any external cause such as deflecting air currents, the body of the vessel will turn horizontally relative to the compass needle and cause the contact carrying pan to turn relative to the compass needle, which theoretically remains fixed. For instance, assume that the longitudinal center of the vessel be turned out of its course to the left. Contact member $c$ will then electrically connect with the wiper $q$ thus completing a circuit through electro-magnet 80 and breaking the circuit through the central magnet 78. On energizing magnet 80 the latter will exert a pull on its core and operate to turn the valve 75 a partial revolution so as to slowly exhaust air from cylinder 62. In event that the vehicle moves quickly to a further position to the left the contact $e$ will electrically connect with the wiper $q$ to complete the circuit through the magnet 82 and break the circuit through electro-magnet 80 energizing magnet 82 which will operate to turn valve 75 to its extreme position to the right fully opening cylinders 62 and 60 to exhaust so that the expansion of air in cylinder 61 will operate to throw valve 45 to its extreme position, fully opening cylinders 30 and 32 to exhaust, thus causing the air in cylinder 31 to expand and throw the rudder to the left. The parts will then be positioned as shown in Figure 11. The rudder 24 being turned to the left will then operate to restore the vehicle to its set straight ahead position;

the contact carrying pan turning relative to the compass and wiper carrying arm so as to move the wiper $q$ successively out of contact with contact members $e$ and $c$ into contact with the central contact member $a$ thus cutting out the magnets 80 and 82 and reenergizing magnet 78 and restoring valves 75 and 45 and the rudder 24 to a normal central position. In event the vessel swings to the right from its set straight ahead position, the contact wiper $q$ will be caused to electrically connect with contact wipers $b$ or $d$ according to the extent of deviation and thereby effect energizing magnets 79 or 81 and operate in the manner described to turn the rudder 24 to the right. The alternate movement of the rudder to the right and left will operate to maintain the vessel in a straight ahead position and to steer it in the predetermined general direction toward an objective point.

In the application of the invention, it is adapted for use wherever it is desired to provide a means for automatically directing a vehicle in a set course, for example, it is applicable for use on airplanes either of the type herein shown or on passenger machines, or it may be used on submarines or torpedoes. It is here shown as applied to a self-controlled airplane for use in warfare in dropping fire, gas, or explosive bombs or other devices upon an objective and is particularly serviceable in attacks on positions beyond the range of heavy artillery such for example as supply stations, camps, cities occupied by military forces, and other positions to be destroyed which present a sufficiently large target to enable a hit being made with a reasonable degree of accuracy. By the use of this invention, together with a suitable stabilizer, an air plane may be directed and controlled, and bombs and other matter dropped by automatic devices, without the aid of an aviator.

For this purpose the airplane may be built of the smallest dimensions possible and it not being necessary to provide it with an aviator, it may be constructed of cheap material at comparatively low cost. By manufacturing the airplane at small cost, it may be destroyed after performing its service without great loss and for this purpose it may be provided with automatic means to insure its destruction not necessary to be here shown.

Whilst the invention has been specifically illustrated and described, it is obvious that various changes in the detail construction and the arrangement of parts may be resorted to as occasion may require without departing from the spirit and scope of the invention set forth in the accompanying claims.

We claim:—

1. In a vessel, a rudder for steering same, an air pressed piston normally maintaining the rudder in a central position, a pair of opposed air pressed pistons connected to the rudder on opposite sides thereof, and valve controlled means for exhausting pressure behind either of the last named pistons and the first named piston whereby expansion of air behind the other piston will operate to swing the rudder, and means operating on said valve means on deviation of the vessel from its course to swing the rudder and normally maintain the vessel in a course.

2. In a steering mechanism of the class described, a rudder, an air pressed piston normally centering said rudder, a pair of separate air pressed pistons arranged to exert opposed thrusts on said rudder, a valve for controlling air pressure on said pistons, triple air pressed pistons operating to normally maintain the valve in a central position, a second valve for controlling air pressure on said last named pistons, and electrical means for normally holding said last named valve in a central position adapted to turn said valve in either direction.

3. A compass controlled relay steering system comprising a rudder, an air pressed piston normally maintaining the rudder in a central position, a pair of separate opposed air pressed pistons connected to the rudder on opposite sides thereof, valve controlled means for exhausting pressure behind the first named piston and simultaneously from behind either of the last named pistons, a second series of triple air pressed pistons for actuating said valve means embodying an intermediate centralizing piston, a valve for controlling air pressures on said last named pistons, a series of solenoid magnets for operating said last named valve including a centralizing magnet, and compass controlled means for selectively energizing said magnets whereby said last named valve may be turned to various positions, to effect operation of said rudder through the sets of air pressed pistons.

WILLIAM HARVEY McGEE.
RENI S. BERRY.